(12) United States Patent
Satoguchi et al.

(10) Patent No.: US 6,925,343 B2
(45) Date of Patent: Aug. 2, 2005

(54) FLOW CONVERSION SYSTEM FOR A MANUFACTURING PROCESS, METHOD FOR CONVERTING A PROCESS FLOW, SYSTEM FOR CONTROLLING MANUFACTURING PROCESS, METHOD FOR CONTROLLING A MANUFACTURING PROCESS AND A COMPUTER PROGRAM PRODUCT

(75) Inventors: Yuichi Satoguchi, Yokohama (JP); Shoichi Harakawa, Yokohama (JP); Takeshi Asamura, Yokohama (JP); Koji Kitajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/795,300

(22) Filed: Mar. 9, 2004

(65) Prior Publication Data

US 2004/0236449 A1 Nov. 25, 2004

(30) Foreign Application Priority Data

Mar. 31, 2003 (JP) ........................................ 2003-097008

(51) Int. Cl.[7] ............................................. G06F 19/00
(52) U.S. Cl. ......................................... 700/96; 700/121
(58) Field of Search ........................... 700/96, 121, 116, 700/917, 108, 103, 95

(56) References Cited

U.S. PATENT DOCUMENTS 4,796,194 A * 1/1989 Atherton .................... 700/103
4,901,242 A * 2/1990 Kotan ......................... 700/108
5,694,325 A   12/1997 Fukuda et al. .............. 700/121
5,694,353 A * 12/1997 Koike ......................... 365/145
5,862,050 A    1/1999 Toyota .......................... 700/97
5,886,896 A *  3/1999 Lantz et al. ................. 700/116
5,937,323 A *  8/1999 Orczyk et al. .............. 438/624
6,041,270 A *  3/2000 Steffan et al. .............. 700/121
6,415,192 B1   7/2002 Satoguchi ................... 700/121

FOREIGN PATENT DOCUMENTS

JP              6-252236       9/1994
JP             11-232338       8/1999

* cited by examiner

Primary Examiner—Leo Picard
Assistant Examiner—Chad Rapp
(74) Attorney, Agent, or Firm—Oblon, Spivak, McClelland, Maier & Neustadt, P.C.

(57) ABSTRACT

A flow conversion system for a manufacturing process includes a flow decomposition module decomposing a process in a target process flow into lower processes based on a process decomposition table to create an intermediate lower process flow; a compatible flow generation module replacing the lower processes with a lower compatible process based on a lower process compatibility table to create an intermediate lower compatible process flow; a flow check module creating a lower process flow including all the lower processes available in production facilities from the intermediate and intermediate lower compatible process flows based on an available process table; a flow selection module selecting the lower process flow by calculating an attribute based on an attribute definition table. An external storage unit stores the process decomposition table, the lower process compatibility table, the available process table, and the attribute definition table.

16 Claims, 19 Drawing Sheets

| CONVERSION PROCESSING NAME | PROCESS DECOMPOSITION TABLE NAME | LOWER PROCESS COMPATIBILITY TABLE NAME | AVAILABLE PROCESS TABLE NAME | ATTRIBUTION DEFINITION TABLE NAME |
|---|---|---|---|---|
| OPERATION INSTRUCTION CREATION | T1 | T2 | T3 | T4 |
| RECIPE CREATION | T5 | T6 | T7 | T8 |

CONVERSION DEFINITION TABLE INFORMATION

FIG. 2

| ID | PROCESS |
|---|---|
| ... | ... |
| 010 | CVD, FILM = Poly, THICKNESS = 10±1nm, CONDITION = {Tox < 0.2nm} |
| 011 | CVD, FILM = SIN, THICKNESS = 5±0.5nm, CONDITION =NON |
| ... | ... |

PROCESS FLOW (1)

FIG. 3

| CONVERSION TARGET PROCESS FLOW NAME | PROCESS FLOW (1) |
|---|---|
| RANGE | 010~011 |
| CONVERSION PROCESSING (1) | OPERATION INSTRUCTION CREATION |
| CONVERSION PROCESSING (2) | RECIPE CREATION |
| PROCESS FLOW SELECTION (1) | OPERATION PERIOD: LESS THAN 10H AND EXPECTED YIELD RATE: MORE THAN 70% |
| PROCESS FLOW SELECTION (2) | USER SELECTION |

CONVERSION PROCEDURE INFORMATION

FIG. 4

| CONVERSION PROCESSING NAME | PROCESS DECOMPOSITION TABLE NAME | LOWER PROCESS COMPATIBILITY TABLE NAME | AVAILABLE PROCESS TABLE NAME | ATTRIBUTION DEFINITION TABLE NAME |
|---|---|---|---|---|
| OPERATION INSTRUCTION CREATION | T1 | T2 | T3 | T4 |
| RECIPE CREATION | T5 | T6 | T7 | T8 |

CONVERSION DEFINITION TABLE INFORMATION

FIG.5

| PROCESS | | LOWER PROCESS | |
|---|---|---|---|
| ID | PATTERN | ID | PATTERN |
| ... | ... | ... | ... |
| 100 | CVD AND THICKNESS = (VALUE 1) ± (VALUE 2)nm | 100-01 | CVD, FILM = DESIGNATED VALUE, THICKNESS = (VALUE 1) nm, CONDITION = DESIGNATED VALUE, InSitu=OFF |
| | | 100-02 | QC, FILM = DESIGNATED VALUE, THICKNESS = (VALUE 1) ± (VALUE 2) nm<br><br>CVD, FILM = DESIGNATED VALUE, THICKNESS = (VALUE 1) ± (VALUE 2) nm, InSitu = ON, CONDITION = DESIGNATED VALUE |
| 101 | CVD AND CONDITION = {Tox < 0.2nm} | 101-01 | CLEANING, SOLUTION = HF, TIME =10 sec<br><br>CVD, FILM = DESIGNATED VALUE, THICKNESS = (VALUE 1) nm, InSitu = DESIGNATED VALUE |
| ... | | ... | ... |

PROCESS DECOMPOSITION TABLE (T1)

FIG. 6

| ID | LOWER PROCESS | CORRESPONDING RELATION |
|---|---|---|
| ... | ... | ... |
| 020 | CLEANING, SOLUTION = HF, TIME = 10sec | 1/2 OF (1/2 OF 010) |
| 021 | CVD, FILM = Poly, THICKNESS = 10nm, InSitu = OFF | 2/2 OF (1/2 OF 010) |
| 022 | QC, FILM = Poly, THICKNESS = 10±1nm | 2/2 OF 010 |
| 023 | CVD, FILM = SiN, THICKNESS = 5nm, InSitu = OFF | 1/2 OF 011 |
| 024 | QC, FILM = SiN, THICKNESS = 5±0.5nm | 2/2 OF 011 |
| ... | ... | ... |

INTERMEDIATE LOWER PROCESS FLOW (1)

FIG. 7

| ID | LOWER PROCESS | CORRESPONDING RELATION |
|---|---|---|
| ... | ... | ... |
| 020 | CLEANING, SOLUTION = HF, TIME = 10sec | 1/2 OF (1/2 OF 010) |
| 021 | CVD, FILM = Poly, THICKNESS = 10nm, InSitu OFF | 2/2 OF (1/2 OF 010) |
| 022 | QC, FILM = Poly, THICKNESS = 10±1nm | 2/2 OF 010 |
| 023 | CVD, FILM = SiN, THICKNESS = 5±0.5nm, InSitu = ON | 1/2 OF 011 |
| ... | ... | ... |

INTERMEDIATE LOWER PROCESS FLOW (2)

FIG. 8

| ID | LOWER PROCESS | CORRESPONDING RELATION |
|---|---|---|
| ... | ... | ... |
| 020 | CLEANING, SOLUTION = HF, TIME = 10sec | 1/2 OF 010 |
| 021 | CVD, FILM = Poly, THICKNESS = 10±1nm, InSitu = ON | 2/2 OF 010 |
| 022 | CVD, FILM = SiN, THICKNESS = 5nm, InSitu = OFF | 1/2 OF 011 |
| 023 | QC, FILM = SiN, THICKNESS = 5±0.5nm | 2/2 OF 011 |
| ... | ... | ... |

INTERMEDIATE LOWER PROCESS FLOW (3)

FIG. 9

| ID | LOWER PROCESS | CORRESPONDING RELATION |
|---|---|---|
| ... | ... | ... |
| 020 | CLEANING, SOLUTION = HF, TIME = 10sec | 1/2 OF 010 |
| 021 | CVD, FILM = Poly, THICKNESS = 10±1nm, InSitu = ON | 2/2 OF 010 |
| 022 | CVD, FILM = SiN, THICKNESS = 5±0.5nm, InSitu = ON | 011 |
| ... | ... | ... |

INTERMEDIATE LOWER PROCESS FLOW (4)

FIG. 10

| LOWER PROCESS | | LOWER COMPATIBLE PROCESS | |
|---|---|---|---|
| ID | PATTERN | ID | PATTERN |
| ... | ... | ... | ... |
| 200 | CVD AND InSitu = OFF<br>QC AND FILM = (VALUE 1)<br>AND THICKNESS =(VALUE 2)<br>CVD AND InSitu = OFF<br>QC AND FILM = (VALUE 3)<br>AND THICKNESS (VALUE 4) | 200-01 | CVD, FILM = DESIGNATED VALUE, THICKNESS = DESIGNATED VALUE,<br>InSitu = DESIGNATED VALUE<br>CVD, FILM = DESIGNATED VALUE, THICKNESS = DESIGNATED VALUE,<br>InSitu = DESIGNATED VALUE<br>QC, FILM = (VALUE 1)→(VALUE 3),<br>THICKNESS = (VALUE 2)→(VALUE 4) |
| ... | ... | ... | ... |

LOWER PROCESS COMPATIBILITY TABLE (T2)

FIG. 11

| ID | LOWER PROCESS | CORRESPONDING RELATION |
|---|---|---|
| ... | ... | ... |
| 020 | CLEANING, SOLUTION = HF, TIME = 10sec | 1/2 OF (1/2 OF 010) |
| 021 | CVD, FILM = Poly, THICKNESS = 10nm, InSitu = OFF | 2/2 OF (1/2 OF 010) |
| 022 | CVD, FILM = SiN, THICKNESS = 5nm, InSitu = OFF | 1/2 OF 011 |
| 023 | QC, FILM = Poly → SiN, THICKNESS = 10±1nm → 5±0.5nm | 2/2 OF 010 AND 2/2 OF 011 |
| ... | ... | ... |

INTERMEDIATE LOWER COMPATIBLE PROCESS FLOW (5)

FIG. 12

| ID | LOWER PROCESS | COMPILING INFORMATION |
|---|---|---|
| ... | ... | ... |
| 300 | CVD AND FILM = Poly AND THICKNESS = 5~20nm AND InSitu = (ON OR OFF) | ADDITION ( RECIPE = P1 ) |
| 301 | CVD AND FILM = SiN AND THICKNESS = 1~10nm AND InSitu = OFF | ADDITION ( RECIPE = S1 ) |
| 302 | CLEANING AND SOLUTION = HF AND TIME = 1~100sec | ADDITION ( RECIPE = H1 ) |
| 303 | QC AND FILM = (Poly OR SiN) AND THICKNESS = UNRESTRAINT | ADDITION ( RECIPE = Q1 ) |
| 304 | QC AND FILM = Poly → SiN AND THICKNESS = UNRESTRAINT | ADDITION ( RECIPE = Q2 ) |
| ... | ... | ... |

AVAILABLE PROCESS TABLE (T3)

FIG. 13

| ID | LOWER PROCESS | CORRESPONDING RELATION |
|---|---|---|
| ... | ... | ... |
| 020 | CLEANING, SOLUTION = HF, TIME = 10sec, RECIPE = H1 | 1/2 OF (1/2 OF 010) |
| 021 | CVD, FILM = Poly, THICKNESS = 10nm, InSitu = OFF, RECIPE = P1 | 2/2 OF (1/2 OF 010) |
| 022 | QC, FILM = Poly, THICKNESS = 10±1nm, RECIPE = Q1 | 2/2 OF 010 |
| 023 | CVD, FILM = SiN, THICKNESS = 5nm, InSitu=OFF, RECIPE = S1 | 1/2 OF 011 |
| 024 | QC, FILM = SiN, THICKNESS = 5±0.5nm, RECIPE = Q1 | 2/2 OF 011 |
| ... | ... | ... |

LOWER PROCESS FLOW (1)

FIG. 14

| ID | LOWER PROCESS | CORRESPONDING RELATION |
|---|---|---|
| ... | ... | ... |
| 020 | CLEANING, SOLUTION = HF, TIME = 10sec, RECIPE = H1 | 1/2 OF 010 |
| 021 | CVD, FILM = Poly, THICKNESS = 10±1nm, InSitu = ON, RECIPE = P1 | 2/2 OF 010 |
| 022 | CVD, FILM = SiN, THICKNESS = 5nm, InSitu = OFF, RECIPE = S1 | 1/2 OF 011 |
| 023 | QC, FILM = SiN, THICKNESS = 5±0.5nm, RECIPE = Q1 | 2/2 OF 011 |
| ... | ... | ... |

LOWER PROCESS FLOW (3)

FIG. 15

| ID | LOWER PROCESS | CORRESPONDING RELATION |
|---|---|---|
| ... | ... | ... |
| 020 | CLEANING, SOLUTION = HF, TIME = 10sec, RECIPE = H1 | 1/2 OF (1/2 OF 010) |
| 021 | CVD, FILM = Poly, THICKNESS =10nm, InSitu = OFF, RECIPE = P1 | 2/2 OF (1/2 OF 010) |
| 022 | CVD, FILM = SiN, THICKNESS = 5nm, InSitu = OFF, RECIPE = S1 | 1/2 OF 011 |
| 023 | QC, FILM = Poly → SiN, THICKNESS = 10±1nm → 5±0.5nm, RECIPE = Q2 | 2/2 OF 010 AND 2/2 OF 011 |
| ... | ... | ... |

LOWER PROCESS FLOW (5)

FIG. 16

| PROCESS FLOW NAME | INTERMEDIATE LOWER PROCESS FLOW (2) |
|---|---|
| ERROR PLACE 1 | ID = 023 |
| ERROR DETAIL 1 | InSitu = ON |

CONVERSION ERROR INFORMATION (INTERMEDIATE LOWER PROCESS FLOW (2))

FIG. 17

| ITEM | METHOD |
|---|---|
| OPERATION PERIOD | CALCULATE [NUMBER OF PROCESSES] * 2H |
| COST | IMPLEMENT COST SIMULATOR X USING LOWER PROCESS FLOW |
| EXPECTED YIELD RATE | RETRIEVE PRODUCTION-YIELD-RESULT-BY-PRODUCT DATABASE USING PRODUCT NAME |

ATTRIBUTE DEFINITION TABLE (T4)

FIG. 18

| ITEM | VALUE |
|---|---|
| OPERATION PERIOD | 10H |
| COST | ¥100000 |
| EXPECTED YIELD RATE | 75.0% |

LOWER PROCESS FLOW ATTRIBUTE INFORMATION

FIG. 19

| PROCESS FLOW NAME | LOWER PROCESS FLOW (1) |
|---|---|
| REASON | OPERATION PERIOD : LESS THAN 10H |

NON-SELECTED PROCESS FLOW INFORMATION
(LOWER PROCESS FLOW (1))

FIG. 20

| PROCESS | | LOWER PROCESS | |
|---|---|---|---|
| ID | PATTERN | ID | PATTERN |
| 300 | RECIPE = Q2 AND FILM = (VALUE 1) → (VALUE 3) AND THICKNESS = (VALUE 2) → (VALUE 4) | 300-01 | EVACUATION, CHAMBER = #1<br>CARRY-IN, CHAMBER = #1, UNIT = LOT<br>MEASUREMENT, FILM = (VALUE 1), THICKNESS = (VALUE 2)<br>EVACUATION, CHAMBER = #2<br>TRANSPORT, PATH = #1 → #2, UNIT = LOT<br>MEASUREMENT, FILM = (VALUE 3), THICKNESS = (VALUE 4)<br>CARRY-OUT, CHAMBER = #2, UNIT = LOT |
| ... | ... | ... | ... |

PROCESS DECOMPOSITION TABLE (T5)

FIG. 21

| LOWER PROCESS | | LOWER COMPATIBLE PROCESS | |
|---|---|---|---|
| ID | PATTERN | ID | PATTERN |
| ... | ... | ... | ... |
| 400 | EVACUATION AND CHAMBER = (VALUE 5).<br>CARRY-IN AND CHAMBER = (VALUE 5) AND UNIT = LOT<br>MEASUREMENT AND FILM = (VALUE 1) AND THICKNESS = (VALUE 2)<br>EVACUATION AND CHAMBER = (VALUE 6)<br>TRANSPORT, PATH = (VALUE 5) → (VALUE 6) UNIT = LOT<br>MEASUREMENT AND FILM = (VALUE 3) AND THICKNESS = (VALUE 4)<br>CARRY-OUT, CHAMBER = (VALUE 6), UNIT = LOT | 400-01 | EVACUATION, CHAMBER = (VALUE 5) & (VALUE 6)<br>CARRY-IN, CHAMBER = (VALUE 5), UNIT = WAFER<br>MEASUREMENT, FILM = (VALUE 1), THICKNESS = (VALUE 2)<br>TRANSPORT, PATH = (VALUE 5)→(VALUE 6), UNIT = WAFER<br>MEASUREMENT, FILM = (VALUE 3), THICKNESS = (VALUE 4)<br>CARRY-OUT, CHAMBER = (VALUE 6), UNIT = WAFER |
| ... | ... | ... | ... |

LOWER PROCESS COMPATIBILITY TABLE (T6)

FIG.22

AVAILABLE PROCESS TABLE (T7)

| ID | LOWER PROCESS | COMPILING INFORMATION |
|---|---|---|
| ... | ... | ... |
| 500 | EVACUATION AND CHAMBER = UNRESTRAINT | ADDITION (CHAMBER RECIPE = EVC) |
| 501 | CARRY-IN AND CHAMBER = (#1 OR #2) AND UNIT = UNRESTRAINT | ADDITION (CHAMBER RECIPE = IN) |
| 502 | CARRY-OUT AND CHAMBER = (#1 OR #2) AND UNIT = UNRESTRAINT | ADDITION (CHAMBER RECIPE = OUT) |
| 503 | TRANSPORT AND CHAMBER = #1→#2 AND UNIT = LOT | ADDITION (CHAMBER RECIPE = TL) |
| 504 | TRANSPORT AND CHAMBER = #1→#2 AND UNIT = WAFER | ADDITION (CHAMBER RECIPE = TW) |
| 505 | MEASUREMENT AND FILM = UNRESTRAINT AND THICKNESS = UNRESTRAINT | ADDITION (CHAMBER RECIPE = M) |
| ... | ... | ... |

FIG. 23

| ITEM | METHOD |
|---|---|
| COST | IMPLEMENT COST SIMULATOR Y USING LOWER PROCESS FLOW |
| OPERATOR LOAD | IMPLEMENT COST SIMULATOR Z USING LOWER PROCESS FLOW |

ATTRIBUTE DEFINITION TABLE (T8)

FIG. 24

| ID | LOWER PROCESS | CORRESPONDING RELATION |
|---|---|---|
| ... | ... | ... |
| 600 | EVACUATION, CHAMBER = #1 | 1/7 OF (2/2 OF 010 AND 2/2 OF 011) |
| 601 | CARRY-IN, CHAMBER = #1, UNIT = LOT | 2/7 OF (2/2 OF 010 AND 2/2 OF 011) |
| 602 | MEASUREMENT, FILM = Poly, THICKNESS = 10±1nm | 3/7 OF (2/2 OF 010 AND 2/2 OF 011) |
| 603 | EVACUATION, CHAMBER = #2 | 4/7 OF (2/2 OF 010 AND 2/2 OF 011) |
| 604 | TRANSPORT, PATH = #1 → #2, UNIT = LOT | 5/7 OF (2/2 OF 010 AND 2/2 OF 011) |
| 605 | MEASUREMENT, FILM = SiN, THICKNESS = 5±0.5nm | 6/7 OF (2/2 OF 010 AND 2/2 OF 011) |
| 606 | CARRY-OUT, CHAMBER = #2, UNIT = LOT | 7/7 OF (2/2 OF 010 AND 2/2 OF 011) |
| ... | ... | ... |

INTERMEDIATE LOWER PROCESS FLOW (I1)

FIG. 25

| ID | LOWER PROCESS | CORRESPONDING RELATION |
|---|---|---|
| ... | ... | ... |
| 600 | EVACUATION, CHAMBER = #1 & #2 | 1/7 OF (2/2 OF 010 AND 2/2 OF 011) AND 4/7 OF (2/2 OF 010 AND 2/2 OF 011) |
| 601 | CARRY-IN, CHAMBER = #1, UNIT = WAFER | 2/7 OF (2/2 OF 010 AND 2/2 OF 011) |
| 602 | MEASUREMENT, FILM = Poly, THICKNESS = 10±1nm | 3/7 OF (2/2 OF 010 AND 2/2 OF 011) |
| 604 | TRANSPORT, PATH = #1→#2, UNIT = WAFER | 5/7 OF (2/2 OF 010 AND 2/2 OF 011) |
| 605 | MEASUREMENT, FILM = SiN, THICKNESS = 5±0.5nm | 6/7 OF (2/2 OF 010 AND 2/2 OF 011) |
| 606 | CARRY-OUT, CHAMBER = #2, UNIT = WAFER | 7/7 OF (2/2 OF 010 AND 2/2 OF 011) |
| ... | ... | ... |

INTERMEDIATE LOWER COMPATIBLE PROCESS FLOW (12)

FIG. 26

| ID | LOWER PROCESS | CORRESPONDING RELATION |
|---|---|---|
| ... | ... | ... |
| 600 | EVACUATION, CHAMBER = #1 CHAMBER RECIPE = EVC | 1/7 OF (2/2 OF 010 AND 2/2 OF 011) |
| 601 | CARRY-IN, CHAMBER = #1, UNIT = LOT, CHAMBER RECIPE = IN | 2/7 OF (2/2 OF 010 AND 2/2 OF 011) |
| 602 | MEASUREMENT, FILM = Poly, THICKNESS = 10±1nm, CHAMBER RECIPE = M | 3/7 OF (2/2 OF 010 AND 2/2 OF 011) |
| 603 | EVACUATION, CHAMBER = #2, CHAMBER RECIPE = EVC | 4/7 OF (2/2 OF 010 AND 2/2 OF 011) |
| 604 | TRANSPORT, PATH = #1→#2, UNIT = LOT, CHAMBER RECIPE = TL | 5/7 OF (2/2 OF 010 AND 2/2 OF 011) |
| 605 | MEASUREMENT, FILM = SiN, THICKNESS = 5±0.5nm, CHAMBER RECIPE = M | 6/7 OF (2/2 OF 010 AND 2/2 OF 011) |
| 606 | CARRY-OUT, CHAMBER = #2, UNIT = LOT, CHAMBER RECIPE = OUT | 7/7 OF (2/2 OF 010 AND 2/2 OF 011) |
| ... | ... | ... |

LOWER PROCESS FLOW (11)

FIG. 27

| ID | LOWER PROCESS | CORRESPONDING RELATION |
|---|---|---|
| ... | ... | ... |
| 600 | EVACUATION, CHAMBER = #1 CHAMBER RECIPE = EVC | 1/7 OF (2/2 OF 010 AND 2/2 OF 011) AND 4/7 OF (2/2 OF 010 AND 2/2 OF 011) |
| 601 | CARRY-IN, CHAMBER = #1, UNIT = WAFER, CHAMBER RECIPE = IN | 2/7 OF (2/2 OF 010 AND 2/2 OF 011) |
| 602 | MEASUREMENT, FILM = Poly, THICKNESS = 10±1nm, CHAMBER RECIPE = M | 3/7 OF (2/2 OF 010 AND 2/2 OF 011) |
| 604 | TRANSPORT, PATH = #1→#2, UNIT = WAFER, CHAMBER RECIPE = TW | 5/7 OF (2/2 OF 010 AND 2/2 OF 011) |
| 605 | MEASUREMENT, FILM = SiN, THICKNESS = 5±0.5nm, CHAMBER RECIPE = M | 6/7 OF (2/2 OF 010 AND 2/2 OF 011) |
| 606 | CARRY-OUT, CHAMBER = #2, UNIT = WAFER, CHAMBER RECIPE = OUT | 7/7 OF (2/2 OF 010 AND 2/2 OF 011) |
| ... | ... | ... |

LOWER PROCESS FLOW (12)

FIG. 28

| ITEM | VALUE |
|---|---|
| COST | ¥100000 |
| OPERATOR LOAD | 20.0 |

LOWER PROCESS FLOW ATTRIBUTE INFORMATION (11)

FIG. 29

| ITEM | VALUE |
|---|---|
| COST | ¥100000 |
| OPERATOR LOAD | 10.0 |

LOWER PROCESS FLOW ATTRIBUTE INFORMATION (12)

FLOW CONVERSION SYSTEM FOR A MANUFACTURING PROCESS, METHOD FOR CONVERTING A PROCESS FLOW, SYSTEM FOR CONTROLLING MANUFACTURING PROCESS, METHOD FOR CONTROLLING A MANUFACTURING PROCESS AND A COMPUTER PROGRAM PRODUCT

CROSS REFERENCE TO RELATED APPLICATIONS

This application is based upon and claims the benefit of priority from prior Japanese Patent Application P2003-097008filed on Mar. 31, 2003; the entire contents of which are incorporated by reference herein.

BACKGROUND OF THE INVENTION

1. Field of the Invention

The present invention relates to conversion of a process flow, more specifically, to converting a process flow describing manufacturing specifications to a process flow describing manufacturing operation procedures and system control procedures.

2. Description of the Related Art

A semiconductor device is generally manufactured by controlling an enormous amount of information including manufacturing apparatuses used in production facilities, operation procedures for manufacturing processes, and the like. Production of semiconductor device is controlled by creating a process flow of the production facilities based on information of the manufacturing apparatuses and the operation procedures. The process flow includes specific information of the production facilities, such as the manufacturing apparatuses to be used, and the operation procedures. When the production of the semiconductor device is transferred to other production facilities, it is necessary to modify the process flow each time in accordance with manufacturing apparatuses to be used in and operation procedures for the other production facilities. Since the volume modification of the process flow is enormous, another process flow is created in practice. On the contrary, there is also a method for transferring a process flow by use of process flow descriptions which are independent on the production facilities.

When using the process flow which is independent of the production facilities, specific information of the respective production facilities such as manufacturing apparatuses to be used in respective processes, and operation procedures used therein, is required. The amount of work for rewriting the process flow which is independent of the production facilities to a specific process flow for the respective production facilities is not different from creating another process flow specific to the respective production facilities. Therefore, efficiency in transferring a process flow is not improved.

Moreover, the information of the manufacturing apparatuses to be used, the operation procedures, and the like is specific information for handling the respective processes. The specific information of the production facilities is easily affected by, for example, problems with the manufacturing apparatuses. Accordingly, the process flow must be modified each time a problem occurs in a manufacturing apparatus.

SUMMARY OF THE INVENTION

A first aspect of the present invention inheres in a flow conversion system for a manufacturing process, including: a flow decomposition module configured to create an intermediate lower process flow by decomposing a process described in a conversion target process flow into a lower process based on a process decomposition table; a compatible flow generation module configured to create an intermediate lower compatible process flow by replacing the lower process with a lower compatible process based on a lower process compatibility table describing the lower compatible process for production facilities equivalent to the lower process; a flow check module configured to create a lower process flow which includes all the lower processes available in the production facilities from the intermediate lower process flow and the intermediate lower compatible process flow based on an available process table; a flow selection module configured to select the lower process flow by calculating an attribute based on an attribute definition table defining the attribute of the lower process; and an external storage unit configured to store the process decomposition table, the lower process compatibility table, the available process table, and the attribute definition table.

A second aspect of the present invention inheres in a computer implemented method for converting process flow, including: acquiring an available process table describing an available process of production facilities, by a flow conversion system; acquiring a conversion target process flow, by the flow conversion system; creating an intermediate lower process flow by decomposing a process in the conversion target process flow into a lower process based on a process decomposition table, by a flow decomposition module; creating an intermediate lower compatible process flow by replacing the lower process of the intermediate lower process flow with a lower compatible process based on a lower process compatibility table which describes the lower compatible process for the production facilities equivalent to the lower process, by a compatible flow generation module; creating a lower process flow, in which each lower process is the available process, from the intermediate lower process flow and the intermediate lower compatible process flow based on the available process table, by a flow check module; and selecting the lower process flow by calculating an attribute of the lower process flow based on an attribute definition table, by a flow selection module.

A third aspect of the present invention inheres in a system for controlling manufacturing process, including: a production control system configured to control production facilities; a flow preparation system configured to prepare a manufacturing specification process flow for the production facilities; and a flow conversion system configured to convert the manufacturing specification process flow into a process flow for the production facilities based on an available process table for the production facilities acquired from the production control system.

A fourth aspect of the present invention inheres in a computer implemented method for controlling a manufacturing process, including: registering an available process table for production facilities with a flow conversion system by a production control system; acquiring a process flow for the production facilities in which a process in a manufacturing specification process flow is converted into a lower process by the flow conversion system based on the available process table, by the production control system; controlling a manufacturing process to be performed in the production facilities by use of the process flow for the production facilities, by the production control system; checking an available process of the production facilities by the production control system; registering another available process table in the flow conversion system when there is a change in the available process of the production facilities, by the production control system; and acquiring another process flow for the production facilities created by converting the manufacturing specification process flow by the flow conversion system based on the new available process table, by the production control system.

A fifth aspect of the present invention inheres in a computer program product configured to be executed by a computer, including: an instruction to acquire an available process table describing an available process of production facilities; an instruction to acquire a conversion target process flow; an instruction to create an intermediate lower compatible process flow by decomposing a process in the conversion target process flow into a lower process based on a process decomposition table; an instruction to create an intermediate lower compatible process flow by replacing the lower process in the intermediate lower process flow with a lower compatible process based on a lower process compatibility table; an instruction to create a lower process flow, in which each lower process is the available process, from the intermediate lower process flow and the intermediate lower compatible process flow based on the available process table; and an instruction to select the lower process flow by calculating an attribute of the lower process flow based on an attribute definition table.

BRIEF DESCRIPTION OF DRAWINGS

FIG. 2 is a view for explaining an example of a process flow of a manufacturing specification used in flow conversion according to the embodiment of the present invention;

FIG. 3 is a view for explaining an example of conversion procedure information used in the flow conversion according to the embodiment of the present invention;

FIG. 4 is a view for explaining an example of conversion definition table information used in the flow conversion according to the embodiment of the present invention;

FIG. 5 is a view for explaining an example of a process decomposition table for creating operation instructions used in the flow conversion according to the embodiment of the present invention;

FIGS. 6 to 9 are views for explaining examples of intermediate lower process flows created by the flow conversion according to the embodiment of the present invention;

FIG. 10 is a view for explaining an example of a lower process compatibility table for creating operation instructions used in the flow conversion according to the embodiment of the present invention;

FIG. 11 is a view for explaining an example of an intermediate lower compatible process flow created by the flow conversion according to the embodiment of the present invention;

FIG. 12 is a view for explaining an example of an available process table for creating operation instructions used in the flow conversion according to the embodiment of the present invention;

FIGS. 13 to 15 are views for explaining examples of lower process flows created by the flow conversion according to the embodiment of the present invention;

FIG. 16 is a view for explaining an example of conversion error information created by the flow conversion according to the embodiment of the present invention;

FIG. 17 is a view for explaining an example of an attribute definition table for creating operation instructions used in the flow conversion according to the embodiment of the present invention;

FIG. 18 is a view for explaining an example of lower process flow attribute information created by the flow conversion according to the embodiment of the present invention;

FIG. 19 is a view for explaining an example of non-selected process flow information created by the flow conversion according to the embodiment of the present invention;

FIG. 20 is a view for explaining an example of a process decomposition table used in recipe creation of the conversion processing according to the embodiment of the present invention;

FIG. 21 is a view for explaining an example of a lower process compatibility table used in the recipe creation of the conversion processing according to the embodiment of the present invention;

FIG. 22 is a view for explaining an example of an available process table used in the recipe creation of the conversion processing according to the embodiment of the present invention;

FIG. 23 is a view for explaining an example of an attribute definition table used in the recipe creation of the conversion processing according to the embodiment of the present invention;

FIG. 24 is a view for explaining an example of an intermediate lower process flow created by the recipe creation of the conversion processing according to the embodiment of the present invention;

FIG. 25 is a view for explaining an example of an intermediate lower compatible process flow created by the recipe creation of the conversion processing according to the embodiment of the present invention;

FIGS. 26 and 27 are views for explaining examples of lower process flows created by the recipe creation of the conversion processing according to the embodiment of the present invention;

FIGS. 28 and 29 are views for explaining examples of lower process flow attribute information created by the recipe creation of the conversion processing according to the embodiment of the present invention;

DETAILED DESCRIPTION OF THE INVENTION

Figure 1:
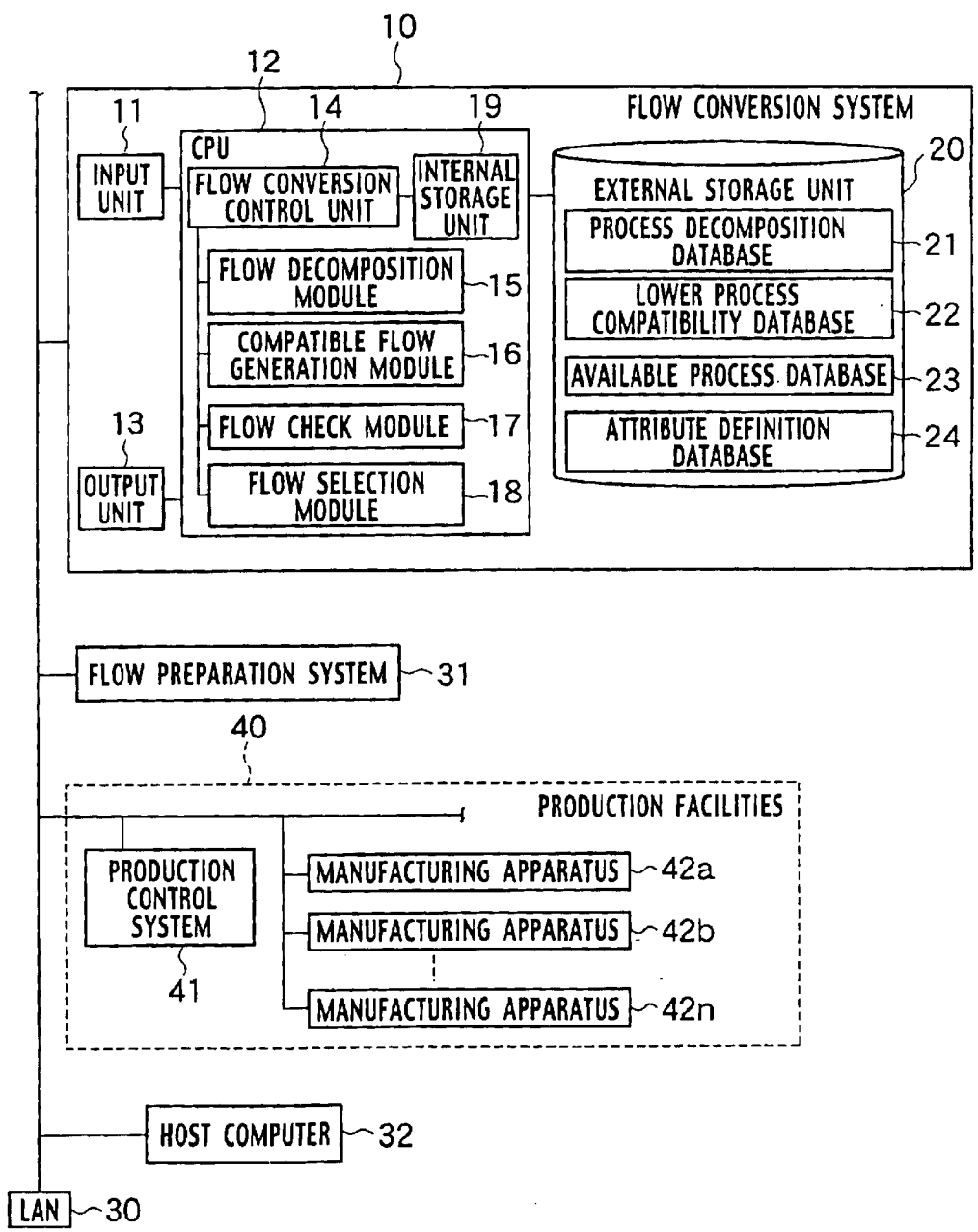
FIG. 1 is a block diagram of a flow conversion system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

As shown in FIG. 1, a flow conversion system 10 according to an embodiment of the present invention includes an input unit 11 for inputting and acquiring a manufacturing specification process flow as a conversion target process flow and flow conversion information such as procedures and definitions for flow conversion, a central processing unit (CPU) 12 for performing conversion processing of a process flow, an output unit 13 for displaying a result of process flow conversion and outputting the converted process flow for production facilities to a production control system 41 of production facilities 40, and an external storage unit 20 for storing various conversion definition tables used for the conversion processing of the process flow. The flow conversion system 10 is connected to a local area network (LAN) 30. In addition, LAN 30 connects the production facilities 40 provided with a plurality of manufacturing apparatuses 42a, 42b, . . . , 42n where manufacturing processes are controlled by the production control system 41, a flow preparation system 31 for preparing the manufacturing specification process flow, conversion procedure information and conversion definition table information, and a host computer 32, thereby establishing a manufacturing process control system.

The CPU 12 in the flow conversion system 10 includes a flow conversion control unit 14 configured to control the conversion processing of the process flow; a flow decomposition module 15 configured to decompose the process described in the conversion target process flow into lower processes based on a process decomposition table, so as to create an intermediate lower process flow; a compatible flow generation module 16 configured to replace the lower process of the intermediate lower process flow with a lower compatible process based on a lower process compatibility table describing the lower compatible process of the production facilities equivalent to the lower process, so as to add an intermediate lower compatible process flow; a flow check module 17 configured to create a lower process flow available to the production facilities from the intermediate lower process flow and the intermediate lower compatible process flow based on an available process table describing an available process of the production facilities; a flow selection module 18 configured to calculate an attribute based on an attribute definition table defining an attribute of the lower process, so as to select the lower process flow; and an internal storage unit 19 configured to store a variety of data with regard to the conversion processing of the process flow and to store a program code for implementing the process flow conversion.

Additionally, an external storage unit 20 stores the conversion definition tables used for conversion of the manufacturing specification process flow for the production facilities 40. For example, the process decomposition table is stored in a process decomposition database 21, the lower process compatibility table is stored in a lower process compatibility database 22, the available process table is stored in an available process database 23, and the attribute definition table is stored in an attribute definition database 24.

From an external system such as the flow preparation system 31, the input unit 11 of the flow conversion system 10 acquires: a manufacturing specification process flow which is independent of the production facilities; the conversion procedure information which defines a conversion range of the manufacturing specification process flow, conversion processings, and conditions for selecting a lower process flow; and the conversion definition table information describing a name of a conversion definition table to be used in the conversion processing. Then, the input unit 11 sends all the above-described information to the flow conversion control unit 14 in the CPU 12. As shown in FIG. 2, a process flow (1) of the manufacturing specification process flow describes an identification number (ID) and processes. As shown in FIG. 3, the conversion procedure information describes a conversion target process flow name, a range, conversion processings, process flow selections, and the like. Moreover, as shown in FIG. 4, the conversion definition table information describes names of the process decomposition table, the lower process compatibility table, the available process table, and the attribute definition table to be used by the flow decomposition module 15, the compatible flow generation module 16, the flow check module 17, and the flow selection module for the conversion processing.

For example, the conversion procedure information of FIG. 3 shows that the range from ID=010 to ID=011, which is a chemical vapor deposition (CVD) process in the process flow (1) of FIG. 2, corresponds to the conversion range. Moreover, the conversion procedure information shows that conversion processing (1) for operation instruction creation is carried out in the conversion range and conversion processing (2) for recipe creation is carried out thereafter. Furthermore, among the lower process flows created by the operation instruction creation, a lower process flow satisfying less than 10 hours of an operation period and an expected yield rate of more than or equal to 70% is selected as an operation instruction lower process flow in the process flow selection (1). In addition, the conversion procedure information shows that the recipe creation is carried out for the selected operation instruction lower process flow and a lower process flow which is selected by a user from the lower process flows created by the recipe is outputted as the process flow for the production facilities in the process flow selection (2). The operation instruction creation and the recipe creation apply process decomposition tables T1 and T5, lower process compatibility tables T2 and T6, available process tables T3 and T7, and attribute definition tables T4 and T8, respectively.

Here, a variable "Film" in FIG. 2 indicates a type of a CVD film. To be more precise, "Poly" indicates a polysilicon film and "SiN" indicates a silicon nitride ($Si_3N_4$) film. A variable "Thickness" indicates a thickness of the polysilicon film or the $Si_3N_4$ film. Furthermore, "Condition" indicates a condition of a wafer surface for carrying out the CVD process. "Tox" indicates a thickness of a native oxide film. "Tox<0.2 nm" indicates that cleaning by, for example, a hydrofluoric acid (HF) solution is necessary.

Although a CVD process is used as a conversion target process in the conversion range in the description of the embodiment, the conversion target processes may include processes involving a change in wafer shape, such as metal deposition, epitaxial growth, etching, and the like. Since there is a difference between the same type of manufacturing apparatuses which can be used in the same process involving the change in the wafer shape, operation procedures may be specific to the respective manufacturing apparatuses.

Here, a description has been provided using an example, in which only a part of the process flow is assigned as the conversion range. However, it is also possible to assign the entire process flow as the conversion range. For example, a part of the process flow may be assigned as the conversion range when performing manufacturing processes by sequentially decomposing the process flow into the operation instructions and recipes. To the contrary, the entire process flow may be assigned as the conversion range when decomposing the process flow into the operation instructions and recipes all together prior to performing the manufacturing processes.

The flow conversion control unit 14 of the CPU 12 controls a sequence of the conversion processing implemented by the flow decomposition module 15, the compatible flow generation module 16, the flow check module 17, and the flow selection module 18. The conversion target process flow (1) and the conversion procedure information acquired by the input unit 11 are sent to the flow decomposition module 15. The intermediate lower process flow which is a result of decomposition by the flow decomposition module 15, is sent to the compatible flow generation module 16. The intermediate lower compatible process flow which is generated by the compatible flow generation module 16, and the intermediate lower process flow are sent to the flow check module 17. The lower process flow which is a checking result of the flow check module 17 and the conversion procedure information are sent to the flow selection module 18. Additionally, by the flow conversion control unit 14, the names of the process composition table, the process compatibility information, the available process table, and the attribute definition table are acquired from the conversion definition table information, and are sent to the flow decomposition module 15, the compatible flow generation module 16, the flow check module 17, and the flow selection module 18, respectively. Note that, when a plurality of conversion processings (1) and (2) are designated in the conversion procedure information as shown in FIG. 3, the flow conversion control unit 14 repeats the above-described processings. A plurality of lower process flows selected by the flow selection module 18 at the end of the precedent conversion processing (1) are the conversion target process flows for the flow decomposition module 15 in the subsequent conversion processing (2).

The flow decomposition module 15 acquires the designated process decomposition table T1 from the process decomposition database 21 of the external storage unit 20 and retrieves the processes in the process flow (1). When there is a pattern of the processes defined in the process decomposition table T1 in the range shown in the conversion procedure information, the flow decomposition module 15 decomposes the pattern into a pattern of the corresponding lower processes so as to create several intermediate lower process flows. When there are a plurality of patterns of the corresponding lower processes, the same number of intermediate lower process flows are created as the number of patterns of the lower processes.

As shown in FIG. 5, the process decomposition table T1 defines the pattern of decomposing the process into the lower process. For example, the process decomposition table T1 shows that a process ID=100 defined as "CVD and Thickness=(Value 1)±(Value 2) nm" is decomposed into a pattern of a lower process ID=100-01 including two lower processes defined as "CVD, Film=Designated Value, Thickness=(Value 1) nm, Condition=Designated Value, InSitu=off" and "QC, Film=Designated Value, Thickness=(Value 1)±(Value 2) nm", and into a pattern of a lower process ID=100-02 including one lower process defined as "CVD, Film=Designated Value, Thickness=(Value 1)± (Value 2) nm, InSitu=on, Condition=Designated Value". Further, a process ID=101 defined as "CVD and Condition= {Tox<0.2 nm}" is decomposed into a pattern of a lower process ID=101-01including two lower processes defined as "Cleaning, Solution=HF, Time=10 sec" and "CVD, Film= Designated Value, Thickness=(Value 1) nm, InSitu= Designated Value." Here, the "Designated Value" indicates a designated value for a corresponding variable in a corresponding process, the "Value 1" and "Value 2" indicate corresponding numeric values in the corresponding variables, and the variable "InSitu" indicates the presence of in-situ monitoring. Moreover, "Cleaning" indicates a cleaning process for a wafer surface performed by use of an etching solution HF indicated by the variable "Solution," and "QC" indicates a quality control (thickness measurement) process for a thickness of the variable "Film".

The process ID=010 of the process flow (1) shown in FIG. 2 coincides with the patterns of the processes ID=100 and 101 in the process decomposition table T1 and is converted into the lower processes indicated in the lower processes ID=100-01, 100-02, and 101-01. In addition, the process ID=011 of the process flow (1) coincides with the pattern of the process ID=100 in the process decomposition table T1 and is converted into the lower processes indicated in the lower processes ID=100-01 and 100-02. Accordingly, the flow decomposition module 15 creates four types of intermediate lower process flows (1) to (4) from the process flow (1) as shown in FIGS. 6 to 9. Each intermediate lower process flow describes a corresponding relation between each process in the original process flow (1) and each lower process. For example, a corresponding relation "½ of (½ of 010)" in a lower process of ID=020 in FIGS. 6 and 7 indicates a first process of the processes is further decomposed into two types from a first process of the process ID=010 which is decomposed into two types from the process flow (1).

The compatible flow generation module 16 acquires the designated lower process compatibility table T2 from the lower process compatibility database 22 of the external storage unit 20 to retrieve the patterns of the lower processes in the decomposed intermediate process flows. When there is a pattern of the lower processes defined in the lower process compatibility table T2 in the intermediate lower process flow, the compatible flow generation module 16 converts the pattern into a pattern of the corresponding lower compatible processes to generate the intermediate lower compatible process flow. In such case, the intermediate lower process flow of the retrieval target is not overwritten. Another intermediate lower compatible process flow is additionally generated.

As shown in FIG. 10, the lower process compatibility table T2 defines a pattern to decompose the lower process into the lower compatible process. For example, the lower process compatibility table T2 shows that a pattern of lower processes ID=200 including four lower processes of "CVD and InSitu=off", "QC and Film=(Value 1) and Thickness= (Value 2)", "CVD and InSitu=off", and "QC and Film= (Value 3) and Thickness=(Value 4)" can be replaced by a pattern of lower compatible processes ID=200-1 including three processes of "CVD, Film=Designated Value, Thickness=Designated Value, InSitu=Designated Value", "CVD, Film=Designated Value, Thickness=Designated Value, InSitu=Designated Value", and "QC, Film=(Value 1)→(Value 3), Thickness=(Value 2)→(Value 4)". Here, the lower compatible process defined as "QC, Film=(Value 1)→(Value 3), Thickness=(Value 2)→(Value 4)" is a process which performs "QC, Film=(Value 1), Thickness=(Value 2)" in a first step and "QC, Film=(Value 3), Thickness=(Value 4)" in a second step.

Among the intermediate lower process flows (1) to (4), the lower processes ID=021 to 024 in the intermediate lower process flow (1) in FIG. 6 coincide with the pattern of the lower processes ID=200 in the lower process compatibility table T2. The compatible flow generation module 16 additionally generates an intermediate lower compatible process flow (5) from the intermediate lower process flow (1) as shown in FIG. 11.

Although a single lower process defines only a single lower compatible process in the above-described example, it may be possible to define a plurality of lower compatible processes. In such a case, intermediate lower compatible process flows are generated for respective combinations of the plurality of lower compatible processes.

The flow check module 17 acquires the designated available process table T3 from the available process database 23 of the external storage unit 20. The flow check module 17 retrieves the available process table T3 based on the information of the lower processes described in the intermediate lower process flows (1) to (4) and the intermediate lower compatible process flow (5). Among the intermediate lower process flows (1) to (4) and the intermediate lower compatible process flow (5), one process flow having all the lower processes registered with the available process table T3 is output as a lower flow. In this event, the respective lower processes are compiled in accordance with compiling information registered with the available process table T3.

As shown in FIG. 12, the available process table T3 defines the power processes available in the production facilities 40 and the compiling information thereof. For example, a lower process ID=300 in the available process table T3 shown in FIG. 12 is defined as "CVD and Film= Poly and Thickness=5 to 20 nm and InSitu=(on or off)". Thus, it is apparent that the lower process ID=021 defined as "CVD, Film=Poly, Thickness=10±1 nm, InSitu=off" indicated in the intermediate lower process flows (1) and (2) in FIGS. 6 and 7 and in the intermediate lower compatible process flow (5) in FIG. 11, and the lower process ID=021 defined as "CVD, Film=Poly, Thickness=10±1 nm, InSitu= on" in the intermediate lower process flows (3) and (4) shown in FIGS. 8 and 9 are available. From the available process table T3, it is apparent that all the lower processes are available except the lower process ID=023 in the intermediate lower process flow (2) and the lower process ID=022 in the intermediate lower process flow (4), both defined as "CVD, Film=SiN, Thickness=5±0.5 nm, InSitu= on". The compiling information registers the addition of designated values P1, S1, H1, Q1, Q2, and the like which correspond to the recipes of the lower processes defined in the production facilities 40. Here, although only the additions are registered as the compiling information, it is also possible to define other compiling operations such as deletion and substitution.

Therefore, the flow check module 17 creates the lower process flows (1), (3), and (5) for the intermediate lower process flows (1), (3) and (5) as shown in FIGS. 13 to 15. In creation of the lower process flows, the compilation shown in the compiling information in the available process table T3 is implemented. For example, the "Recipe=P1" is added to the lower process ID=020 in the intermediate lower process flow (1).

In addition, conversion error information indicating an intermediate lower process flow name, a portion generating an error, and a detail of error is created for the intermediate lower process flow which does not have an available lower process and sent to the output unit 13 together with the intermediate lower process flow. The output unit 13 outputs data of the conversion error information and the intermediate lower process flow to an external system such as the production control system 41. Furthermore, the output unit 13 also displays the data on a screen, and saves the data, for example, in the external storage unit 20. As shown in FIG. 16, the conversion error information corresponding to the intermediate lower process flow (2) shows that the "InSitu= on" added to the lower process ID=023 has an error.

The flow selection module 18 acquires the designated attribute definition table T4 from the attribute definition database 24 of the external storage unit 20. The flow selection module 18 creates lower process flow attribute information in terms of the lower process flows (1), (3), and (5) created by the flow check module 17 from attributes defined in the attribute definition table T4 in accordance with defined methods. Based on the lower process flow attribute information, the lower process flow is selected by a method designated by the conversion procedure information shown in FIG. 3.

As shown in FIG. 17, the attribute definition table T4 defines calculation methods for three attribute items of an operation period, a cost, and an expected yield rate of a lower process flow as "Calculate [Number of Processes] *2H", "Implement Cost Simulator X Using Lower Process Flow", and "Retrieve Production-Yield-Result-By-Product Database Using Product Name", respectively. Here, the cost simulator X for calculating the cost using the lower process flow, and the production-yield-result-by-product database which is a database of yield rate results of products in accordance with the names of the products are stored, for example, in the external storage unit 20. Note that the cost simulator X and the production-yield-result-by-product database may be stored in the production control system 41 or the host computer 32, instead of the external storage unit 20.

The flow selection module 18 creates the lower process flow attribute information in terms of the lower process flows (1), (3), and (5) in accordance with the defined methods. For example, as shown in FIG. 18, the lower process flow attribute information for the lower process flow (1) indicates that the operation period is 10 hours, the cost is 100,000 yen, and the expected yield rate is 75.0%. Moreover, the flow selection module 18 selects the lower process flow (5) satisfying the condition of the process flow (1) designated by the conversion procedure information shown in FIG. 3 and sends the lower process flow (5) to the flow conversion control unit 14.

In addition, the flow selection module 18 creates non-selected process flow information indicating a process flow name and a reason for the non-selected lower process flows (1) and (3) and sends the lower process flows (1) and (3) to the output unit 13 together with the lower process flow attribute information. The output unit 13 outputs data of the non-selected process flow information to an external system, such as the production control system 41. Furthermore, the output unit 13 also displays the data on a screen, and saves the data, for example, in the external storage unit 20. For example, as shown in FIG. 19, the non-selected process flow information corresponding to the lower process flow (1) indicates that the lower process flow (1) is not selected because of the operation period of 10 hours which does not satisfy the condition of "Operation period: less than 10H".

As described above, in the embodiment of the present invention, the flow conversion control unit 14 controls the conversion processing (1) for the process flow shown in FIG. 3 and creates the operation instructions. Moreover, the flow conversion control unit 14 creates the recipe in the conversion processing (2) after creation of the operation instruction in accordance with the conversion procedure information. In the recipe creation, the flow conversion control unit 14 controls the conversion processing (2) for recipe creation again, similar to the above-described conversion processing (1) for the operation instruction creation by use of the lower process flow (5) selected in the operation instruction creation as another conversion target process flow. Here, to avoid a complicated explanation, a description will be given of a process of converting the lower process ID=023 defined as "QC, Film=Poly→SiN, Thickness=10±1 nm→5±0.5 nm, Recipe=Q2" in the lower process flow (5).

According to the conversion definition table information in FIG. 4, the name of the process decomposition table used for the recipe creation is "T5", the name of the lower process compatibility table is "T6", the name of the available process table is "T7", and the name of the attribute definition table is "T8". The process decomposition table T5, the lower process compatibility table T6, the available process table T7, and the attribute definition table T8 are stored in the process decomposition database 21, the lower process compatibility database 22, the available process database 23, and the attribute definition database 24, respectively.

As shown in FIG. 20, the process decomposition table T5 shows that a pattern of the process ID=300 "Recipe=Q2 and Film=(Value 1)→(Value 3) and Thickness=(Value 2)→(Value 4)" is decomposed into seven patterns in a lower process ID=300-01, namely, "Evacuation, Chamber=#1," "Carry-In, Chamber=#1, Unit=Lot", "Measurement, Film=(Value 1), Thickness=(Value 2)", "Evacuation, Chamber=#2," "Transport, Path=#1→#2, Unit=Lot", "Measurement, Film=(Value 3), Thickness=(Value 4)", and "Carry-Out, Chamber #2, Unit=Lot".

As shown in FIG. 21, the lower process compatibility table T6 shows that seven patterns in a lower process ID=400 "Evacuation, Carry-In, Measurement, Evacuation, Transport, Measurement, and Carry-Out" are converted into six patterns in a lower compatible process ID=400-1 "Evacuation, Carry-In, Measurement, Transport, Measurement, and Carry-Out". In the lower compatible process, two lower processes for evacuation based on Chamber=(Value 5) and (Value 6) are integrated into one process. Moreover, a target unit in "Carry-In", "Transport", or "Carry-Out" process is changed from "Lot" to "Wafer".

As shown in FIG. 22, the available process table T7 shows available lower processes for the production facilities 40 together with the compiling information. Chamber recipes "EVC", "IN", "OUT", "TL", "TW", and "M" are added to "Evacuation", "Carry-In", "Carry-Out", "Transport (by the lot)", "Transport (by the wafer)", and "Measurement" processes in lower process ID=500 to ID=505, respectively. Although only an addition operation is registered with the compiling information, it is also possible to define other compiling operations such as deletion and substitution.

As shown in FIG. 23, the attribute definition table T8 shows attribute items of the lower process flow and definitions of methods. A manufacturing cost and an operator load incurred by the lower process flow are calculated by implementing a cost simulator Y and a cost simulator Z. Here, the cost simulators Y and Z for calculating the costs using the lower process flow are stored in, for example, the external storage unit 20. Note that the cost simulators Y and Z may be stored in, for example, the production control system 41 or the host computer 32, instead of the external storage unit 20.

The flow conversion control unit 14 controls the flow of the conversion processing by the flow decomposition module 15, the compatible flow generation module 16, the flow check module 17, and the flow selection module 18 based on the lower process flow (5) as the target process flow. The flow decomposition module 15 creates an intermediate lower process flow (11) as shown in FIG. 24 from the target process flow and the process decomposition table (T5). The compatible flow generation module 16 generates an intermediate lower compatible process flow (12) as shown in FIG. 25 from the intermediate lower process flow (11) based on the lower process compatibility table (T6). The flow check module 17 checks the available lower processes in the intermediate lower process flow (11) and the intermediate lower compatible process flow (12) based on the available process flow table (T7) and creates a lower process flow (11) and a lower process flow (12) as shown in FIGS. 26 and 27, respectively. The flow selection module 18 calculates the respective manufacturing costs and operator loads incurred by the lower process flows (11) and (12) in accordance with the attribute definition table (T8) and creates lower process flow attribute information (11) and (12) as shown in FIGS. 28 and 29. Moreover, the lower process flow is selected by the "User Selection" designated in the process flow selection (2) of the conversion procedure information shown in FIG. 3. For example, the lower process flow (12) requiring half of the operator load compared to that of the lower process flow (11) is selected by the user and outputted from the output unit 13 to the production control system 41 of the production facilities 40 as the process flow for the production facilities.

Thus, the flow conversion control unit 14 implements the recipe creation after the operation instruction creation and controls all the conversion processing designated by the conversion procedure information. In addition, the specific information for the production facilities 40 is defined in advance in the conversion definition table. Therefore, according to the flow conversion system 10 of the embodiment of the present invention, it is possible to efficiently convert the manufacturing specification process flow, which is independent on the production facilities, into the lower process flow corresponding to the production facilities 40.

In the above-described example, the process decomposition table, the lower process compatibility table, the available process table, and the attribute definition table are all defined in the conversion definition table information as the conversion definition tables corresponding to the respective types of the conversion processing. However, it is satisfactory if at least one of the process decomposition table, the lower process compatibility table, the available process table, and the attribute definition table is defined. In such case, an acquired process flow for each of the conversion processings is directly sent as an output process flow. For example, when the process decomposition table is not designated, the manufacturing specification process flow sent from the input unit 11 to the flow decomposition module 15 is directly renamed to the intermediate lower process flow and sent to the compatible flow generation module 16. In addition, flow attribute information is not created when the attribute definition table is not designated. In such case, the process flow selection which does not require flow attribute information is designated in the conversion procedure information.

Furthermore, among the conversion definition tables, only the available process table is the conversion definition table specific to the production facilities 40. It is possible to use the process decomposition table, the lower process compatibility table, and the attribute definition table in common, for example, among different production facilities in the same factory or among production facilities in different factories of one company or a different company. Therefore, the attribute definition tables stored in advance in the process decomposition database 21, the lower process compatibility database 22, the available process database 23, and the attribute definition database 24 can be used as the process decomposition table, the lower process compatibility table, and the attribute definition table. With regard to the available process table, the production control system 41 of the target production facilities 40, for example, checks the available processes including repair and failure conditions of the respective manufacturing apparatuses 42a to 42n, and the like. Then, the production control system 41 accesses the external storage unit as necessary and updates the available process table in the available process database 23. When the available process table is updated, the flow conversion system 10 implements the conversion processing again so as to create another process flow for the production facilities 40.

Figure 30:
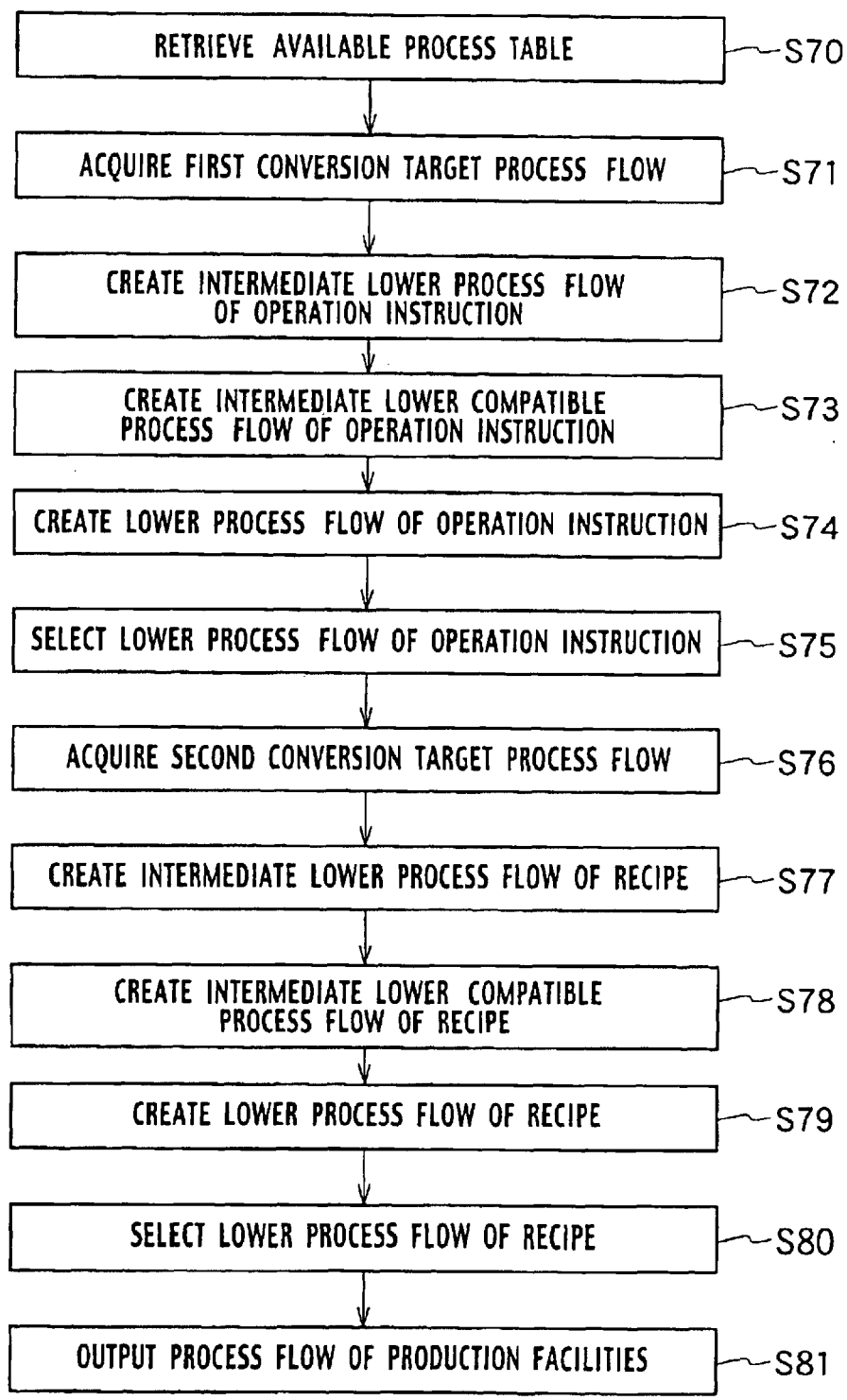
FIG. 30 is a flowchart for explaining a method for converting a process film according to the embodiment of the present invention.

Next, a flow conversion method according to the embodiment of the present invention will be described by use of a flowchart shown in FIG. 30.

a) In Step S70, an available process table for the production facilities 40 shown in FIG. 1 is acquired from the production control system 41 and registered with the external storage unit 20 of the flow conversion system 10.

b) In Step S71, a manufacturing specification process flow as a first conversion target process flow is acquired from the flow preparation system 31 shown in FIG. 1 together with conversion procedure information and conversion definition table information by use of the input unit 11 of the flow conversion system 10.

c) In Step S72, the flow conversion control unit 14 controls the input unit 11 to send the first conversion target process flow and the conversion procedure information to the flow decomposition module 15. Furthermore, the flow conversion control unit 14 accesses the external storage unit 20 to send a process decomposition table for operation instruction creation designated by the conversion definition table information to the flow decomposition module 15. The flow decomposition module 15 retrieves processes in the first conversion target process flow and implements the conversion processing (1) for the operation instruction creation in a range shown in the conversion procedure information. The flow decomposition module 15 decomposes the first conversion target process flow into patterns of lower processes based on the definitions in the process decomposition table so as to create an intermediate lower process flow for the operation instructions.

d) In Step S73, the flow conversion control unit 14 sends the intermediate lower process flow created by the flow decomposition module 15 to the compatible flow generation module 16 and accesses the external storage unit 20 to send a designated lower process compatibility table to the compatible flow generation module 16. The compatible flow generation module 16 retrieves the patterns of the lower processes in the intermediate lower process flow. When there is a pattern of the lower processes defined in the lower process compatibility table in the intermediate lower process flow, the compatible flow generation module 16 replaces the corresponding lower processes with the pattern of the lower compatible processes and additionally generates an intermediate lower compatible process flow for the operation instructions.

e) In Step S74, the flow conversion control unit 14 sends the intermediate lower process flow and the intermediate lower compatible process flow created by the flow decomposition module 15 and the compatible flow generation module 16 to the flow check module 17 and accesses the external storage unit 20 to send the designated available process table to the flow check module 17. The flow check module 17 retrieves the available process table based on the information on the lower processes described in the intermediate lower process flow and the intermediate lower compatible process flow. The intermediate lower process flow and the intermediate lower compatible process flow having all the lower processes registered in the available process table are created as the lower process flows for the operation instructions. Additionally, the respective lower processes are compiled in accordance with the compiling information registered with the available process table.

f) In Step S75, the flow conversion control unit 14 sends the lower process flow created by the flow check module 17 to the flow selection module 18 and accesses the external storage unit 20 to send a designated attribute definition table to the flow selection module 18. The flow selection module 18 creates lower process flow attribute information in accordance with a method defined in the attribute definition table in terms of the lower process flow. Moreover, the flow selection module 18 selects the lower process flow for the operation instructions in accordance with the definition of the process flow selection (1) which is designated by the conversion procedure information based on the lower process flow attribute information.

g) Next, in Step S76, the flow conversion control unit 14 implements the conversion processing (2) for recipe creation based on conversion procedure information and conversion definition table information while applying the lower process flow of the operation instructions selected by the flow selection module 18 as a second conversion target process flow. Additionally, the flow conversion control unit 14 accesses the external storage unit 20 to send respective conversion definition tables for the recipe creation.

h) In Step S77, the flow decomposition module 15 decomposes the second conversion target process flow based on the process decomposition table sent from the flow conversion control unit 14 so as to create an intermediate lower process flow for the recipe.

i) In Step S78, the compatible flow generation module 16 replaces lower processes in the intermediate lower process flow with lower compatible processes based on the lower process compatibility table sent from the flow conversion control unit 14, so as to create an intermediate lower compatible process flow for the recipe.

j) In Step S79, the flow check module 17 retrieves the lower processes and the lower compatible processes in the intermediate lower process flow and the intermediate lower compatible process flow based on the available process table sent from the flow conversion control unit 14. The intermediate lower process flow and the intermediate lower compatible process flow having all the lower processes or the lower compatible processes registered with the available process table are created in lower process flows for the recipe. Additionally, the respective lower processes are compiled in accordance with the compiling information registered with the available process table.

k) In Step S80, the flow selection module 18 creates lower process flow attribute information based on the attribute definition table sent from the flow conversion control unit 14. In addition, the lower process flow for the recipe is selected based on the lower process flow attribute information by the user in accordance with the definition of the process flow selection (2) designated by the conversion procedure information.

l) In Step S81, the flow conversion control unit 14 sends the lower flow of the selected recipe to the output unit 13 as a process flow for the production facilities 40. Moreover, the lower flow is output from the output unit 13 to the production control system 41 of the production facilities 40.

As described above, in the method for converting a process flow according to the embodiment of the present invention, the manufacturing specification process flow, which is independent of the production facilities 40, is converted into the lower process flow by use of the available process table specific to the production facilities 40 which is stored in advance in the external storage unit 20. Therefore, it is possible to efficiently create the production facilities process flow corresponding to the production facilities 40. Moreover, according to the method for converting a process flow of the embodiment of the present invention, transfer of the process flow between the production facilities can be simply and efficiently achieved by only registering the available process tables for the respective production facilities with the external storage unit 20.

Figure 31:
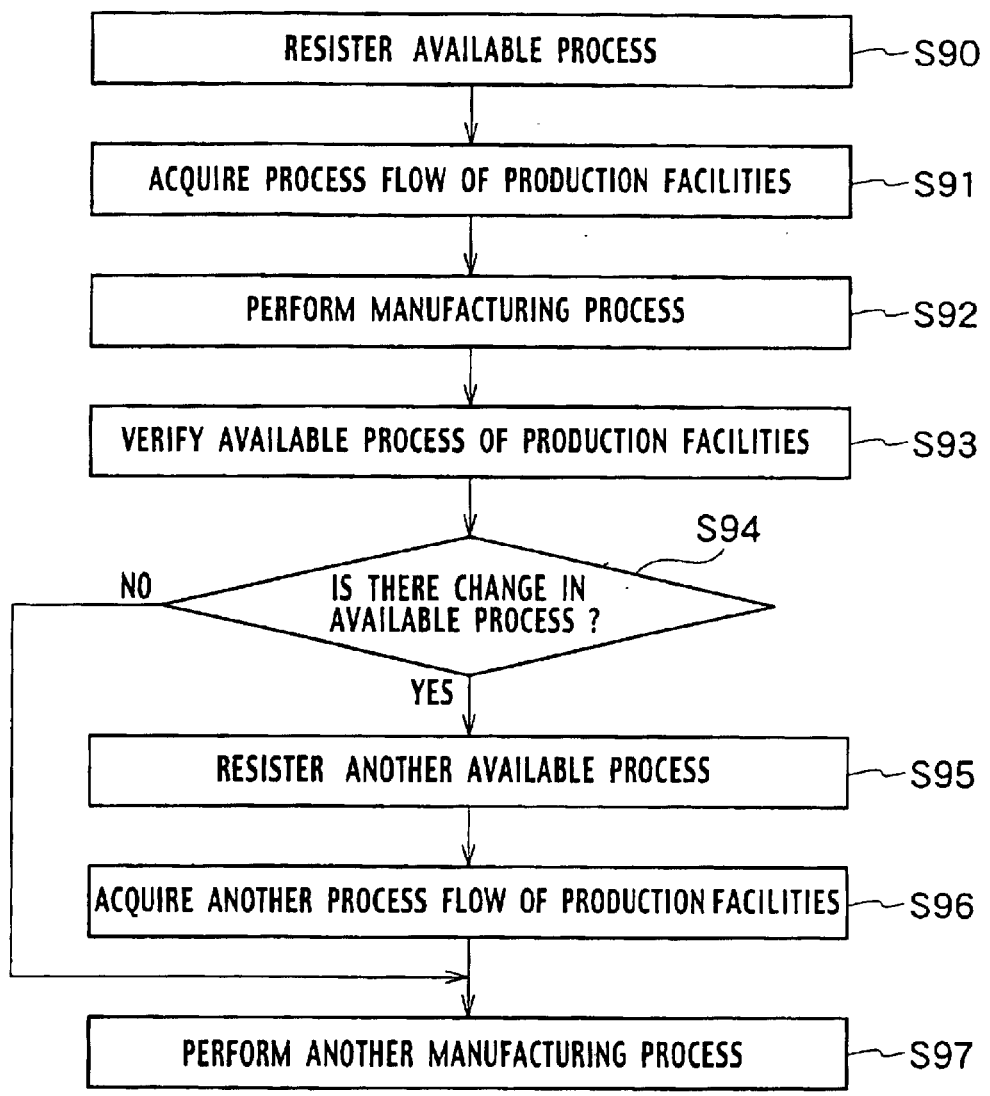
FIG. 31 is a flowchart for explaining a method for controlling a manufacturing process according to the embodiment of the present invention.

In addition, it is possible to achieve simple and efficient control of the manufacturing processes by use of the method for converting a process flow according to the embodiment of the present invention. For example, applying a method for controlling a manufacturing process according to the embodiment of the present invention to a system for controlling a manufacturing process, including the production facilities 40 shown in FIG. 1, will be described by use of a flowchart shown in FIG. 31.

a) In Step S90, the production control system 41 registers an available process table for the production facilities 40 with the external storage unit 20 of the flow conversion system 10.

b) In Step S91, a process flow for production facilities created by converting the processes in the manufacturing specification process flow into the lower processes based on the available process table is acquired from the flow conversion system 10.

c) In Step S92, the production facilities 40 perform the manufacturing process by use of the process flow for the production facilities 40.

d) In Step S93, the production control system 41 checks the available processes of the production facilities 40.

e) In Step S94, verification is performed as to whether the available processes of the production facilities 40 are changed. When there is no change in the available process, another manufacturing process is performed in accordance with the process flow for the production facilities in Step S97.

f) When there is a change in the available processes of the production facilities 40, another available process table is registered in the external storage unit 20 of the flow conversion system 10 in Step S95.

g) In Step S96, the production control system 41 acquires the another process flow for the production facilities 40 which is created by converting the manufacturing specification process flow based on the another available table by the flow conversion system 10.

h) In Step S97, another manufacturing process is performed in accordance with the another process flow for the production facilities 40.

According to the embodiment of the present invention, it is possible to update the available process table for the production facilities 40 at anytime and change the process flow for the production facilities in accordance with variations of the available processes of the production facilities 40. Therefore, it is possible to control the manufacturing process easily and efficiently.

Figure 32:
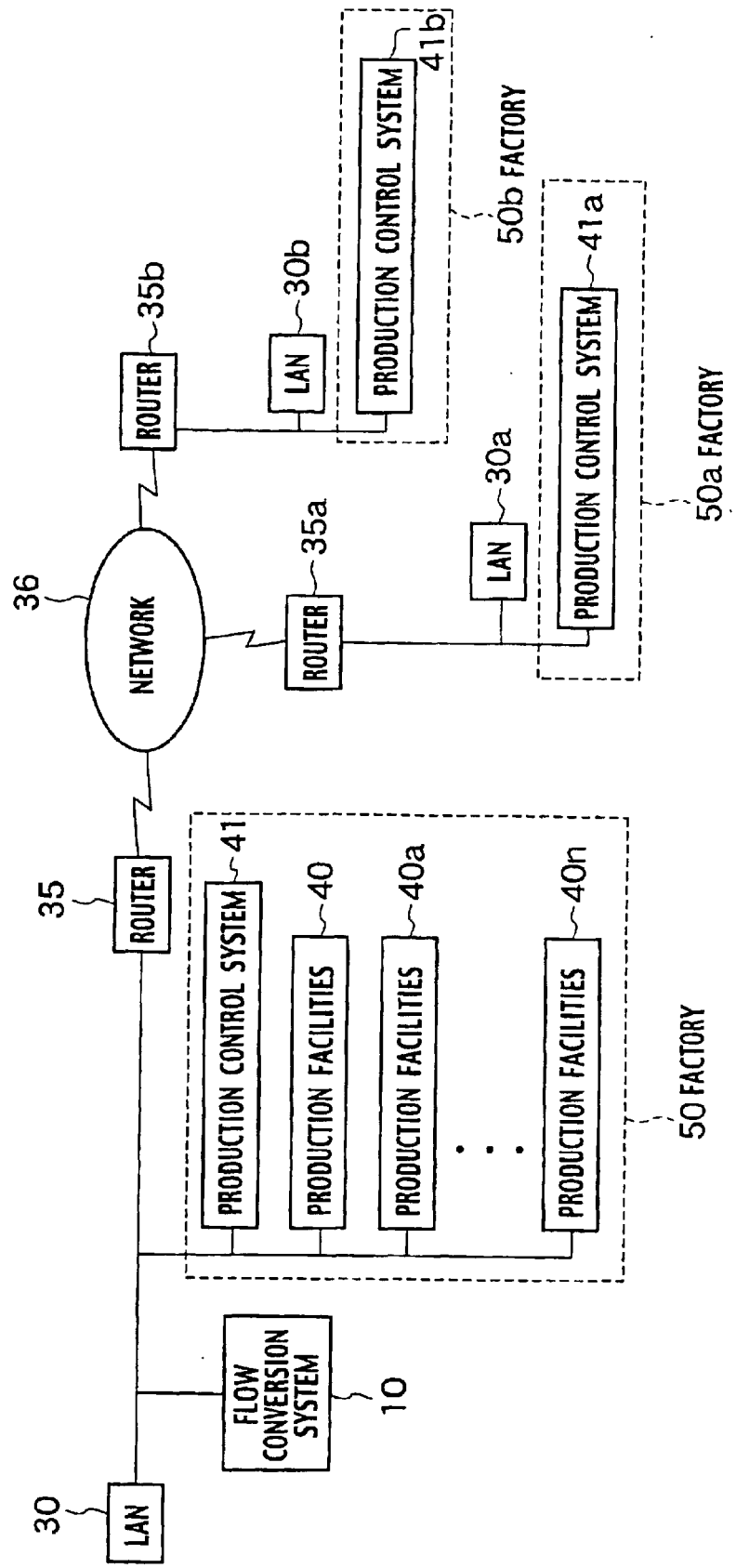
FIG. 32 is a block diagram showing an example of a configuration of factories having a plurality of production facilities for executing the method for converting a process flow according to the embodiment of the present invention.

Moreover, it is also possible to apply the method for converting a process flow or the method for controlling a manufacturing process according to the embodiment of the present invention not only to the production facilities 40 but also to other production facilities in the same factory or to different production facilities in different factories of the same company or a different company. For example, as shown in FIG. 32, the process flow for the production facilities corresponding to each of a plurality of production facilities 40 to 40n installed in a factory 50 is connected through a LAN 30 connecting the flow conversion system 10. The process flow can be created by registering each of the available process tables with the flow conversion system 10. Thus, it is possible to control the manufacturing processes easily and efficiently by the production control system 41 in the factory 50. Moreover, by connection to a network 36 using the Internet or a dedicated line via a router 35 of the LAN 30, it is possible to access production facilities in factories 50a and 50b of the same company or a different company, which are connected by remote LANs 30a and 30b. By use of production control systems 41a and 41b for controlling the respective production facilities in the respective factories 50a and 50b, it is possible to implement the method for converting a process flow and the method for controlling a manufacturing process efficiently by use of the flow conversion system 10 connected to the LAN 30.

(Other Embodiments)

The embodiment of the present invention has been described based on the flow conversion system 10 in the form of an independent computer or the like. However, it is also possible to incorporate the functions of the flow conversion system 10 in, for example, the host computer 32, the production control system 41, or the flow preparation system 31.

Various modifications will become possible for those skilled in the art after storing the teachings of the present disclosure without departing from the scope thereof.

What is claimed is:

1. A flow conversion system for a manufacturing process, comprising:
   a flow decomposition module configured to decompose a process described in a conversion target process flow into lower processes based on a process decomposition table so as to create an intermediate lower process flow with the lower processes;
   a compatible flow generation module configured to replace the lower processes with lower compatible processes based on a lower process compatibility table describing the lower compatible processes for production facilities equivalent to the lower processes so as to create an intermediate lower compatible process flow with the lower compatible processes;
   a flow check module configured to create a lower process flow which includes all the lower processes available in the production facilities from the intermediate lower process flow and the intermediate lower compatible process flow based on an available process table;
   a flow selection module configured to select the lower process flow by calculating an attribute based on an attribute definition table defining the attribute of the lower process flow; and
   an external storage unit configured to store the process decomposition table, the lower process compatibility table, the available process table, and the attribute definition table.

2. The system of claim 1, further comprising:
   a flow conversion control unit configured to control each processing of the flow decomposition module, the compatible flow generation module, the flow check module, and the flow selection module based on conversion procedure information defining a procedure of conversion processing for the conversion target process flow.

3. The system of claim 1, further comprising:
   an input unit configured to acquire a manufacturing specification process flow as the conversion target process flow; and
   an output unit configured to output the lower process flow selected by the flow selection unit.

4. A computer implemented method for converting process flow, comprising:
   acquiring an available process table describing an available process of production facilities, by a flow conversion system;
   acquiring a conversion target process flow, by the flow conversion system;
   decomposing a process described in the conversion target process flow into lower processes based on a process decomposition table so as to create an intermediate lower process flow with the lower processes, by a flow decomposition module;
   replacing the lower processes with lower compatible processes based on a lower process compatibility table describing the lower compatible processes for the production facilities equivalent to the lower processes so as to create an intermediate lower compatible process flow with the lower compatible processes, by a compatible flow generation module;
   creating a lower process flow, in which each of the lower processes is the available process, from the intermediate lower process flow and the intermediate lower compatible process flow based on the available process table, by a flow check module; and
   selecting the lower process flow by calculating an attribute of the lower process flow based on an attribute definition table defining the attribute of the lower process flow, by a flow selection module.

5. The method of claim 4, wherein a first available process table for operation instruction creation is acquired as the available process table, a manufacturing specification process flow is acquired as the conversion target process flow, and an operation instruction lower process flow is selected as the lower process flow.

6. The method of claim 5, further comprising: outputting the selected lower process flow as a manufacturing process flow, by acquiring a second available process table for recipe creation as the available process table, and the operation instruction lower process flow as the conversion target process flow.

7. A system for controlling manufacturing process, comprising:
   a production control system configured to control production facilities;
   a flow preparation system configured to prepare a manufacturing specification process flow for the production facilities; and
   a flow conversion system configured to convert the manufacturing specification process flow into a process flow for the production facilities based on an available process table for the production facilities acquired from the production control system.

8. The system of claim 7, wherein the flow conversion system further comprises:
   an input unit configured to acquire the manufacturing specification process flow;
   a central processing unit configured to implement conversion processing;
   an external storage unit configured to store the available process table; and
   an output unit configured to output the process flow for the production facilities to the production control system.

9. The system of claim 8, wherein the central processing unit further comprises:
   a flow decomposition module configured to decompose a process described in a conversion target process flow into lower processes based on a process decomposition table so as to create an intermediate lower process flow with the lower processes;
   a compatible flow generation module configured to replace the lower processes with lower compatible processes based on a lower process compatibility table describing the lower compatible processes for the production facilities equivalent to the lower processes so as to create an intermediate lower compatible process flow with the lower compatible processes;
   a flow check module configured to create a lower process flow available in the production facilities from the intermediate lower process flow and the intermediate lower compatible process flow based on the available process table;
   a flow selection module configured to select the lower process flow by calculating an attribute based on an attribute definition table defining the attribute of the lower process flow; and
   a flow conversion control-unit configured to control respective processing operations of the flow decomposition module, the compatible flow generation module, the flow check module, and the flow selection module based on conversion procedure information defining a procedure of the conversion processing for the conversion target process flow.

10. A computer implemented method for controlling a manufacturing process, comprising:
    registering an available process table for production facilities with a flow conversion system by a production control system;
    acquiring a process flow for the production facilities in which a process in a manufacturing specification process flow is converted into lower processes by the flow conversion system based on the available process table, by the production control system;
    controlling a manufacturing process to be performed in the production facilities by use of the process flow for the production facilities, by the production control system;
    checking an available process of the production facilities by the production control system;
    registering another available process table in the flow conversion system when there is a change in the available process of the production facilities, by the production control system; and
    acquiring another process flow for the production facilities created by converting the manufacturing specification process flow by the flow conversion system based on the another available process table, by the production control system.

11. The method of claim 10, wherein conversion of the manufacturing specification process flow implemented by the flow conversion system comprises:
    acquiring a conversion target process flow;
    decomposing a process described in the conversion target process flow into the lower processes based on a process decomposition table so as to create an intermediate lower process flow with the lower processes;

replacing the lower processes with lower compatible processes based on a lower process compatibility table describing the lower compatible processes for the production facilities equivalent to the lower processes so as to create an intermediate lower compatible process flow with the lower compatible processes;

creating a lower process flow, in which each of the lower processes is the available process, from the intermediate lower process flow and the intermediate lower compatible process flow based on the available process table; and selecting the lower process flow by calculating an attribute of the lower process flow based on an attribute definition table defining the attribute of the lower process flow.

12. The method of claim 11, wherein a first available process table for operation instruction creation is acquired as the available process table, a manufacturing specification process flow is acquired as the conversion target process flow, and an operation instruction lower process flow is selected as the lower process flow.

13. The method of claim 12, further comprising: outputting the selected lower process flow as a manufacturing process flow, by acquiring a second available process table for recipe creation as the available process table, and the operation instruction lower process flow as the conversion target process flow.

14. The method of claim 10, wherein the production control system checks the available process after completion of an entire manufacturing process described in the process flow for the production facilities.

15. The method of claim 10, wherein the production control system checks the available process while performing a manufacturing process described in the process flow for the production facilities.

16. A computer program product configured to be executed by a computer, comprising:

an instruction to acquire an available process table describing an available process of production facilities;

an instruction to acquire a conversion target process flow;

an instruction to decompose a process described in the conversion target process flow into lower processes based on a process decomposition table so as to create an intermediate lower compatible process flow with the lower prcesses;

an instruction to replace the lower processes with lower compatible processes based on a lower process compatibility table describing the lower compatible processes for the production facilities equivalent to the lower processes so as to create an intermediate lower compatible process flow with the lower compatible processes;

an instruction to create a lower process flow, in which each of the lower processes is the available process, from the intermediate lower process flow and the intermediate lower compatible process flow based on the available process table; and an instruction to select the lower process flow by calculating an attribute of the lower process flow based on an attribute definition table defining the attribute of the lower process flow.

* * * * *